United States Patent
Hong et al.

(10) Patent No.: US 7,789,794 B2
(45) Date of Patent: Sep. 7, 2010

(54) METHOD AND SYSTEM FOR CONTROLLING A PROPULSION SYSTEM OF AN ALTERNATIVELY POWERED VEHICLE

(75) Inventors: Khang Thanh Hong, Novi, MI (US); William David Treharne, Ypsilanti Township, MI (US); Paul Stephen Bryan, Belleville, MI (US); Shunsuke Okubo, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 482 days.

(21) Appl. No.: 11/877,115

(22) Filed: Oct. 23, 2007

(65) Prior Publication Data
US 2009/0105037 A1    Apr. 23, 2009

(51) Int. Cl.
| | |
|---|---|
| B60K 1/02 | (2006.01) |
| F16H 59/64 | (2006.01) |
| B60W 10/04 | (2006.01) |
| G05D 23/00 | (2006.01) |
| H02K 17/32 | (2006.01) |

(52) U.S. Cl. .............. 477/3; 477/98; 180/65.285; 318/472; 318/473; 318/434

(58) Field of Classification Search .............. 477/3, 477/7, 98; 180/65, 285; 388/934; 318/471, 318/472, 473, 432, 433, 434
See application file for complete search history.

(56) References Cited

U.S. PATENT DOCUMENTS

| | | | |
|---|---|---|---|
| 6,009,362 A | 12/1999 | Furukawa | |
| 6,377,880 B1 | 4/2002 | Kato et al. | |
| 6,450,275 B1 | 9/2002 | Gabriel et al. | |
| 6,664,751 B1 | 12/2003 | Gabriel et al. | |
| 7,553,257 B2 * | 6/2009 | Shigeta et al. | 477/98 |
| 2004/0235613 A1 * | 11/2004 | Aoki et al. | 477/3 |
| 2006/0183596 A1 * | 8/2006 | Etchason et al. | 477/98 |
| 2007/0049456 A1 * | 3/2007 | Shimizu et al. | 477/3 |
| 2009/0036263 A1 * | 2/2009 | Iwase et al. | 477/3 |
| 2009/0066283 A1 * | 3/2009 | Son et al. | 318/473 |
| 2009/0072770 A1 * | 3/2009 | Son et al. | 318/139 |
| 2009/0099791 A1 * | 4/2009 | Zettel et al. | 702/45 |

FOREIGN PATENT DOCUMENTS

| | | |
|---|---|---|
| JP | 2004076603 | 3/2004 |
| WO | 2005108134 A1 | 11/2005 |
| WO | 2006095929 A1 | 9/2006 |

\* cited by examiner

*Primary Examiner*—Roger Pang
(74) *Attorney, Agent, or Firm*—David B. Kelley; Brooks Kushman P.C.

(57) ABSTRACT

Inverters of a hybrid electric vehicle are cooled by a coolant. Expected temperature differences between the inverters and the coolant are determined based on vehicle parameters. Actual temperature differences between the inverters and the coolant are compared to the expected temperature differences. A maximum output torque is reduced if the actual temperature differences exceed the expected temperature differences.

19 Claims, 3 Drawing Sheets

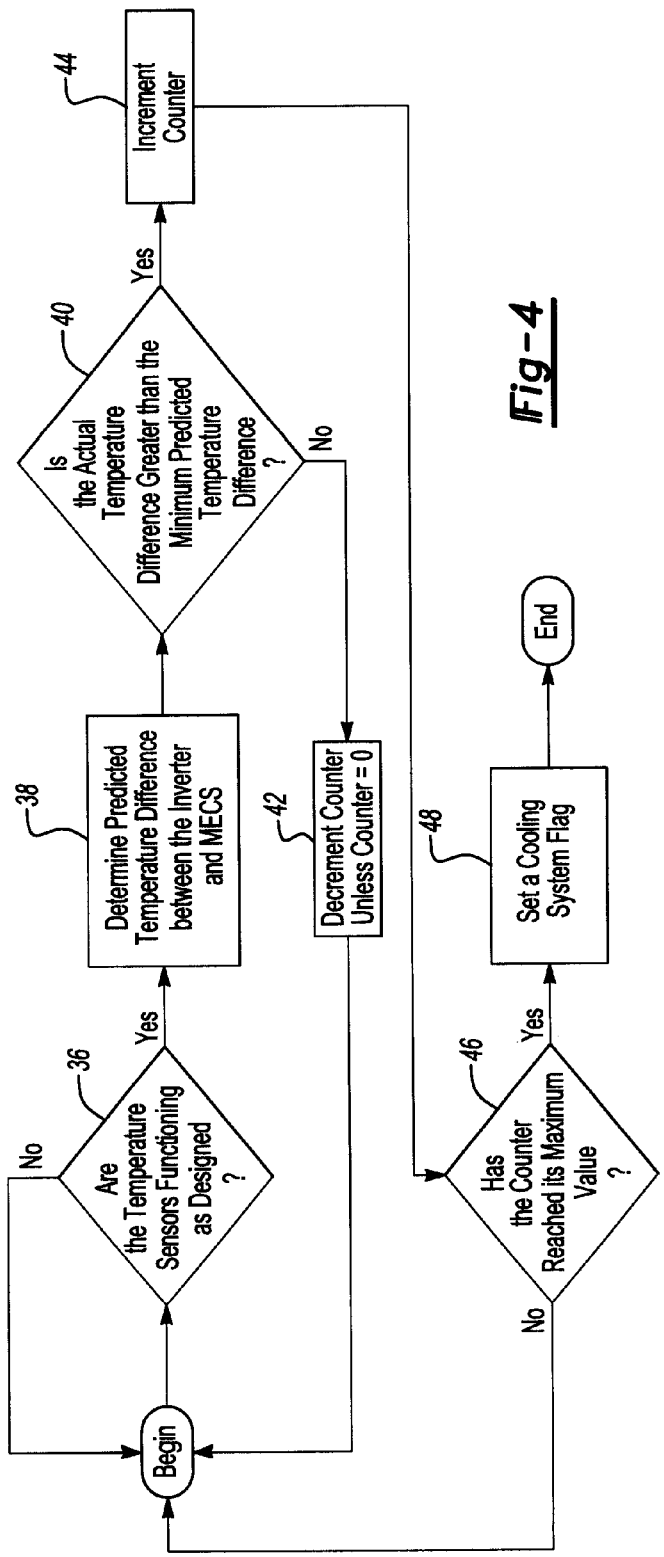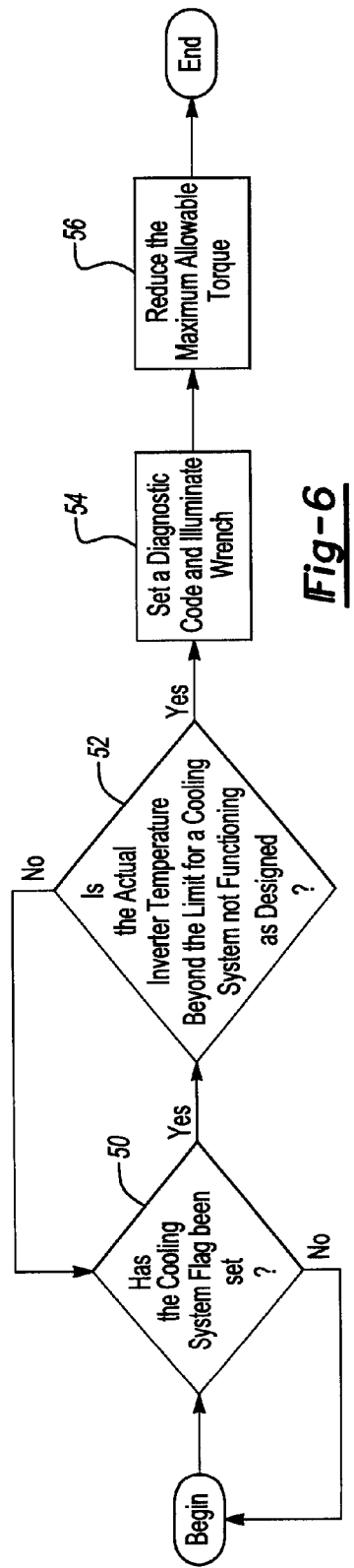

METHOD AND SYSTEM FOR CONTROLLING A PROPULSION SYSTEM OF AN ALTERNATIVELY POWERED VEHICLE

BACKGROUND

1. Field of the Invention

The invention relates to methods and systems for controlling propulsion systems of alternatively powered vehicles.

2. Background Art

Various methods are used to detect operating states of vehicle systems. U.S. Pat. No. 6,009,362 to Furukawa is an example of such a method. According to Furukawa, an anomalous condition detecting apparatus includes a detector for detecting a pair of positive and negative terminals of a fan motor. The apparatus also includes a decision circuit for deciding whether an anomalous condition exists based on a voltage detected between the terminals. An external resistor is provided between the positive terminal of the motor and a power source. The negative terminal of the motor is earthed. A voltage between the terminals is detected. The decision circuit decides that an anomalous condition exists when the potential of the positive terminal is smaller than a predetermined value.

U.S. Pat. No. 6,377,880 to Kato et al. is another example of such a method. According to Kato et al., a cooling fan failure detection apparatus for a hybrid vehicle comprises a cooling capacity calculation device, which calculates a cooling capacity of a cooling fan, a battery heating value calculation device, which calculates a heating value of a battery, and an assumed temperature change calculating device, which calculates an assumed temperature change of the battery based on the heating value and the cooling capacity. The apparatus further comprises an actual temperature change calculating device, which calculates an actual temperature change of the battery, and a failure determination device. The failure determination device determines whether the cooling fan is failing by comparing the assumed temperature change and the actual temperature change.

International Pub. No. WO 2006/095929 to Yanagida is yet another example of such a method. According to Yanagida, a start control repeatedly performs a start-up process for a start of an oil pump. In the event of a failed start-up of the oil pump by repetition of the start-up process, the start control specifies the occurrence of an abnormality in the oil pump or in the power supply to the oil pump at an outside air temperature that is not lower than a present reference temperature.

SUMMARY

A propulsion system for and method for controlling an alternatively powered vehicle is provided. The propulsion system includes an electric machine having a maximum output torque, power electronics to control the electric machine and a coolant to cool the electric machine and power electronics. An expected temperature difference between the coolant and the power electronics is determined. An actual temperature difference between the coolant and the power electronics is also determined. Whether the actual temperature difference is greater than the expected temperature difference is determined and the maximum output torque of the electric machine is reduced if the actual temperature difference is greater than the expected temperature difference.

BRIEF DESCRIPTION OF THE DRAWINGS

FIG. 4 is flow chart of an exemplary strategy for detecting whether an inverter is functioning as designed in accordance with certain embodiments of the invention.

FIG. 6 is a flow chart of an exemplary strategy for managing a motor electronics cooling system in accordance with certain embodiments of the invention.

DETAILED DESCRIPTION

Strategies and techniques are described herein with reference to an alternatively powered vehicle having a powersplit hybrid transaxle with two electric machines. The strategies and techniques described herein, however, may be applied to other alternatively powered vehicles having any number of electric machines. As an example, the strategies and techniques described herein may be applied to a parallel hybrid vehicle having a single electric machine. As another example, the strategies and techniques described herein may be applied to a series hybrid vehicle having four electric machines.

A motor electronics cooling system (MECS) for a powersplit hybrid transaxle may use a liquid cooling system driven by an electric pump to transfer heat generated from the transaxle to the atmosphere. This system uses a coolant-to-air radiator design which may be similar to that used for an internal combustion engine.

Figure 1:
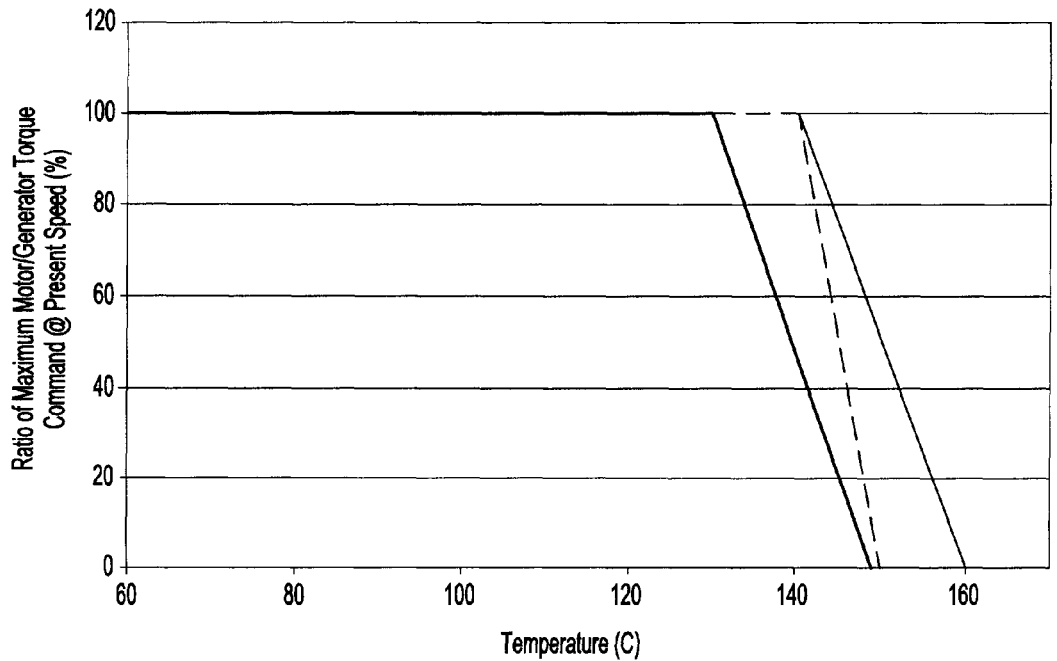
FIG. 1 is an exemplary plot of a ratio of a maximum motor/generator torque command at a present vehicle speed versus an inverter temperature, coil temperature and oil temperature.

When the MECS is functioning as designed, it is able to provide sufficient cooling to the inverters, motor/generator coils, and transmission fluid. Under certain operating conditions, the inverters, coils, and/or transmission fluid may reach temperatures near their functional limits. To prevent the transaxle components from exceeding their functional limits, a transmission control unit (TCU) may reduce the amount of torque output depending on the actual temperature of its components. As may be seen in the example of FIG. 1, a ratio of a maximum motor/generator torque command at a present vehicle speed is reduced beyond certain threshold inverter temperatures (as indicated by heavy solid line), coil temperatures (as indicated by light solid line) and oil temperatures (as indicated by dashed line). This torque reduction strategy permits the transaxle components to cool down before allowing the vehicle to return to full drivability.

When the MECS is not functioning as designed, e.g., there is an incorrect coolant type in the system, the above torque reduction strategy may not cool the transaxle components quickly enough to allow a return to full vehicle drivability. As an example, the power electronics of the inverters may quickly transition from a normal temperature to a maximum temperature. At this maximum temperature limit, the TCU may put the vehicle into a limited operating state (LOS) or quit on road (QOR) condition depending on whether the motor's electronics or the generator's electronics have surpassed their limits.

Detection and management strategies described herein may be similar for a motor inverter and a generator inverter. Each inverter, however, may be independently evaluated. The time at which torque reduction begins to occur may be independently controlled. By separating the detection and management of each inverter, vehicle drivability may be maximized. As an example, at highway cruising speeds, the generator provides a greater amount of torque as compared to the motor. This may cause the generator to achieve a temperature at which it no longer functions as designed. As another example, under steep grade conditions, the motor provides a greater amount of torque as compared to the generator. This may cause the motor to achieve a temperature at which it no longer functions as designed.

Figure 2:
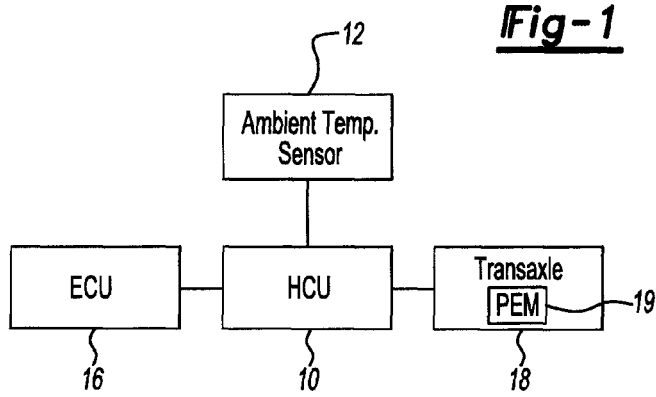
FIG. 2 is a block diagram of a portion of an exemplary hybrid electric automotive vehicle.

As may be seen in the example of FIG. 2, a hybrid control unit (HCU) 10 communicates with an ambient temperature sensor 12, engine control unit (ECU) 16 and a transaxle 18 including a power electronics module (PEM) 19. As indicated above, other configurations are also possible.

Figure 3:
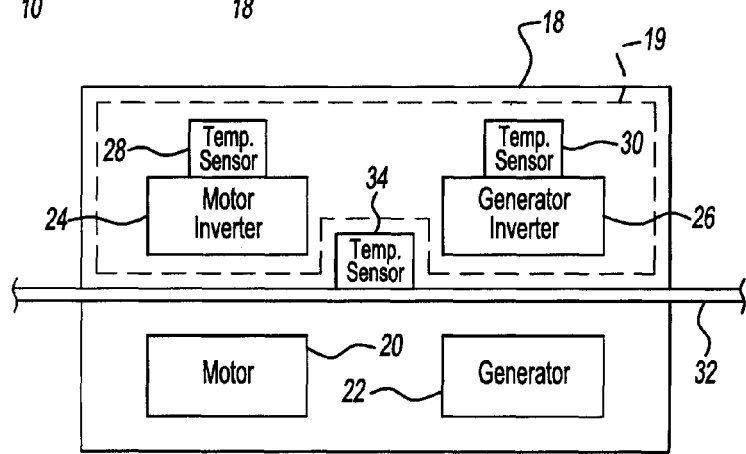
FIG. 3 is a block diagram of the transaxle of FIG. 2.

As may be seen in the example of FIG. 3, the transaxle 18 includes a motor 20 and a generator 22. In other examples, the transaxle may include a fewer or greater number of electric machines. The PEM 19 includes motor and generator inverters 24, 26 and temperature sensors 28, 30 which monitor the temperatures of the motor and generator inverters 24, 26 respectively. A cooling line 32 of a MECS passes through the transaxle 18. The cooling line 32 carries a fluid to cool the motor 20 and generator 22 and motor and generator inverters 24, 26. A temperature sensor 34 monitors the temperature of the fluid of the cooling line 32.

Detection

Some of the detection strategies herein are based on the linearly dependent relationship between torque outputs of the motor 20 and generator 22 and a temperature rise of the inverters 24, 26 over a temperature of the fluid of the cooling line 32, referred to herein as INV_DELTA_T. As may be seen in the example of FIG. 4, at block 36, the HCU 10 determines whether the temperature sensors 12, 28, 30, 34 are functioning as designed. If no, the strategy returns to Begin. The operation of the temperature sensors 12, 28, 30, 34 may then be remediated in any suitable fashion. If yes, the HCU 10 determines, at block 38, a predicted temperature difference between each of the inverters 24, 26 and the temperature of the fluid of the cooling line 32. The predicted temperature differences are based on the ambient temperature and respective torque commands for the motor 20 and generator 22, which are linearly proportional with the torque outputs of the motor 20 and generator 22 respectively. In other examples, the predicted temperature may be based on factors such as a cooling fan speed and vehicle speed. To make this determination, the HCU 10, for example, may consult a look-up table stored in memory populated with such data. This data may be gathered via testing, simulation or any other desired technique.

At block 40, the HCU 10 determines whether either of the actual temperature differences between the inverters 24, 26 and the temperature of the fluid of the cooling line 32 is greater than its respective predicted temperature difference. The HCU 10, for example, reads the temperature sensors 28, 30, 34 to calculate the actual temperature differences. If no, the HCU 10, at block 42, decrements a counter unless the counter is equal to zero. The strategy then returns to Begin. If yes, the HCU 10, at block 44, increments the counter. At block 46, the HCU 10 determines if the counter has reached its maximum value. This maximum value may be calibratible and depend on design considerations. If no, the strategy returns to Begin. If yes, a cooling flag is set at block 48. The strategy then proceeds to End.

Figure 5:
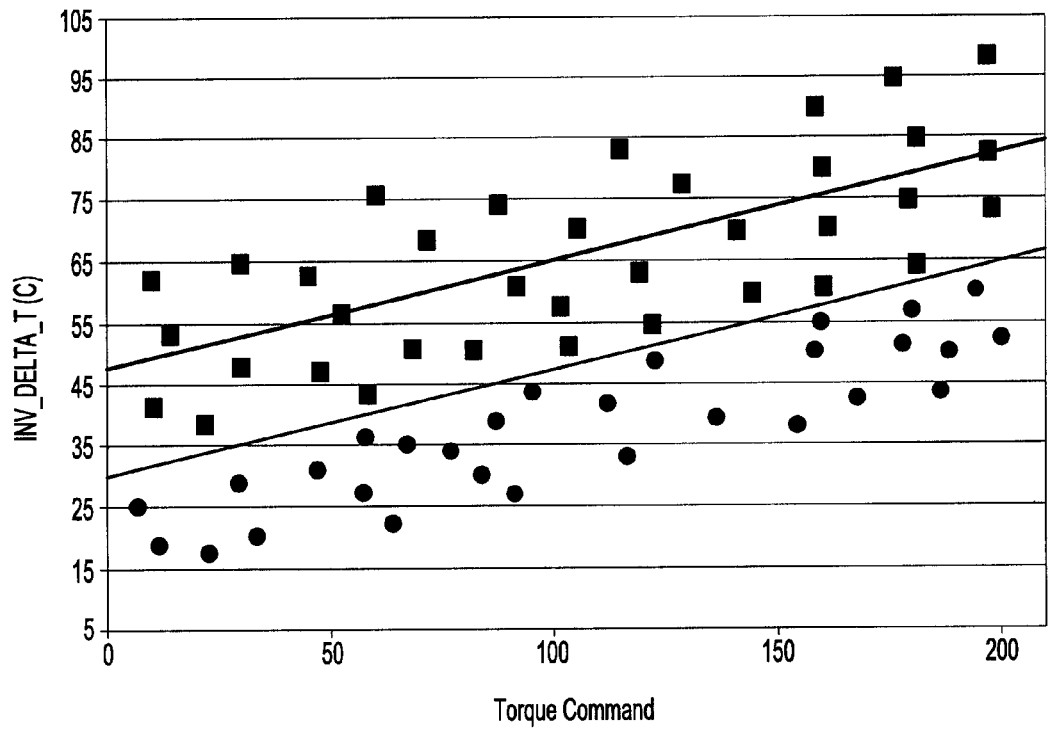
FIG. 5 is an exemplary plot of a temperature difference between one of the inverters of FIG. 3 and the fluid in the cooling line of FIG. 3 versus a torque command for a given ambient temperature.

As may be seen in the example of FIG. 5, the circular data points indicate measured INV_DELTA_T, at various torque commands for the motor 20, when the MECS is functioning as designed. The square data points indicate measured INV_DELTA_T, at various torque commands for the motor 20, when the MECS is not functioning as designed.

Similar data may be obtained via analysis, testing or simulation for generator 22. The lower line is selectively drawn to indicate the minimum predicted INV_DELTA_T. The upper line is selectively drawn to indicate the maximum predicted INV_DELTA_T. The lower line may be the calibratable limit at which the counter discussed above is incremented or decremented.

As discussed below, a percentage of torque reduction may be calculated as a linear interpolation of the actual INV_DELTA_T relative to the upper and lower lines of FIG. 5. For example, a lesser amount of torque reduction may occur when temperature differences are closer to the lower line. A greater amount of torque reduction may occur when temperature differences are closer to the upper line. Other techniques may also be used to determine the percentage of torque reduction. As an example, a single line may be selectively drawn on FIG. 5 to indicate the predicted INV_DELTA_T. The percentage of torque reduction may be a fixed amount that is applied when the actual INV_DELTA_T exceeds the predicted INV_DELTA_T.

Management

In the example of FIGS. 2 and 3, most of the power loss from the inverters 24, 26 is dissipated in the form of heat. The amount of power loss increases as the electrical power output of the inverters 24, 26 increases. The amount of torque output by the motor 20 and generator 22 is proportional to the electrical power output of the inverters 24, 26 respectively. If functioning properly, the heat generated by the inverters 24, 26 is equal to or less than the amount of heat that may be dissipated by the MECS. If not functioning properly, the heat generated by the inverters 24, 26 may be greater than the amount of heat that may be dissipated by the MECS. Limiting the amount of torque output by the motor 20 and generator 22 limits the heat generated by the inverters 24, 26 respectively.

As may be seen in the example of FIG. 6, at block 50, the HCU 10 determines whether the cooling system flag has been set. If no, the strategy returns to Begin. If yes, the HCU 10, at block 52, determines if the actual temperature differences of the inverters 24, 26 are beyond the limit for a cooling system not functioning as designed. If no, the strategy returns to block 50. If yes, the HCU 10, at block 54, sets a diagnostic code and illuminates a wrench. At block 56, the HCU 10 reduces the maximum allowable torque. The strategy then proceeds to End.

Figure 7:
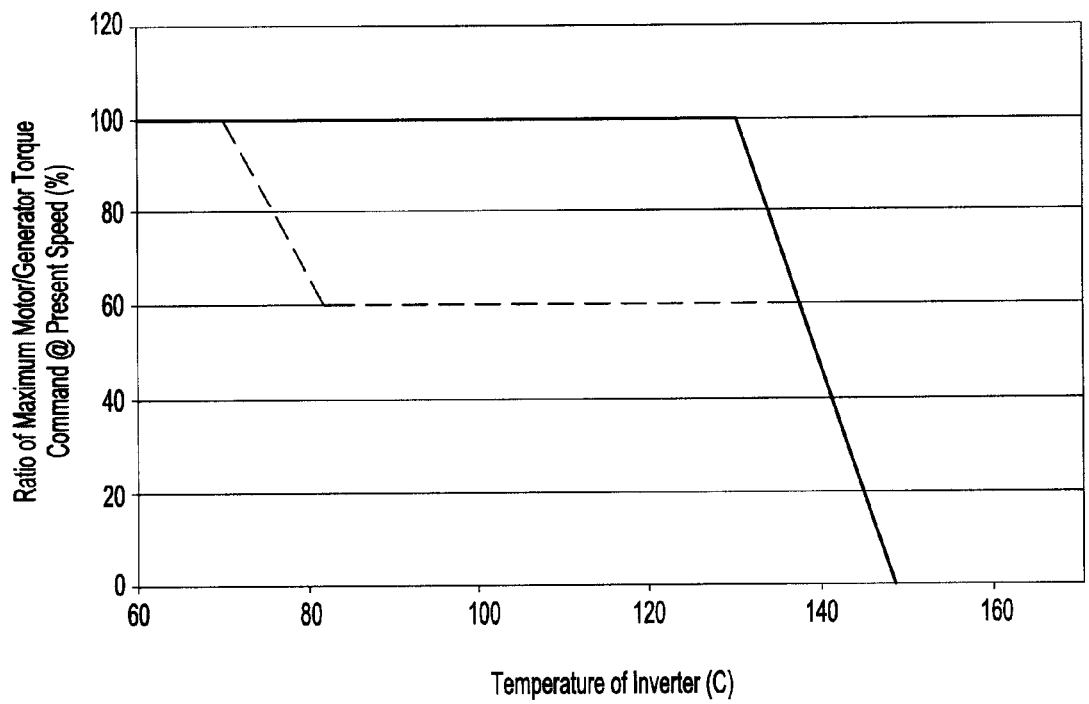
FIG. 7 is an exemplary plot of a ratio of a maximum motor/generator torque command at a present vehicle speed versus an inverter temperature.

In the example of FIG. 6, the amount of torque reduction depends on the actual INV_DELTA_T relative to the minimum and maximum predicted INV_DELTA_T. As an example, if torque reduction is warranted and the actual INV_DELTA_T is halfway between the minimum and maximum predicted INV_DELTA_T of FIG. 5, then, as may be seen in the example of FIG. 7, the HCU 10 may reduce the ratio of motor torque command at the present vehicle speed from 100% to a value halfway between the solid and dotted lines, or 80%, for motor inverter temperatures between approximately 75 and 140 Celsius. The solid line indicates the minimum torque reduction calibrated when the MECS is not functioning as designed. The dotted line indicates the maximum torque reduction calibrated when the MECS is not functioning as designed. The closer the actual INV_DELTA_T is to the minimum predicted INV_DELTA_T, the lesser the torque reduction. If the actual INV_DELTA_T is equal to or greater than the maximum predicted INV_DELTA_T, the HCU 10 will reduce the torque by 100% of the calibrated table of FIG. 7.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for controlling a propulsion system of an alternatively powered vehicle, the propulsion system including an electric machine having a maximum output torque, power electronics to control the electric machine and a coolant to cool the electric machine and power electronics, the method comprising:
   determining an expected temperature difference between the coolant and the power electronics;
   determining an actual temperature difference between the coolant and the power electronics;
   determining whether the actual temperature difference is greater than the expected temperature difference; and
   reducing the maximum output torque of the electric machine if the actual temperature difference is greater than the expected temperature difference.

2. The method of claim 1 wherein the expected temperature difference is based on a torque command for the electric machine.

3. The method of claim 1 wherein the expected temperature difference is based on an ambient temperature.

4. The method of claim 1 wherein the expected temperature difference is based on vehicle speed.

5. The method of claim 1 further comprising incrementing a counter if the actual temperature difference is greater than the expected temperature difference and determining whether the counter has exceeded a threshold wherein the maximum output torque of the electric machine is reduced if the counter has exceeded the threshold.

6. The method of claim 1 wherein the maximum output torque of the electric machine is reduced by an amount based on the difference between the actual temperature difference and the expected temperature difference.

7. A method for controlling a propulsion system of an alternatively powered vehicle, the propulsion system including an electric machine having a maximum output torque, power electronics to control the electric machine and a coolant to cool the electric machine and power electronics, the method comprising:
   determining expected maximum and minimum temperature differences between the coolant and the power electronics;
   determining an actual temperature difference between the coolant and the power electronics;
   determining if the actual temperature difference is greater than the expected minimum temperature difference and less than the expected maximum temperature difference; and
   reducing the maximum output torque of the electric machine by an amount based on the difference between the actual temperature difference and the expected temperature differences if the actual temperature difference is greater than the expected minimum temperature difference and less than the expected maximum temperature difference.

8. The method of claim 7 wherein the expected minimum temperature difference is a predetermined function of a torque command for the electric machine.

9. The method of claim 7 wherein the expected minimum temperature difference is a predetermined function of an ambient temperature.

10. The method of claim 7 wherein the expected minimum temperature difference is a predetermined function of vehicle speed.

11. The method of claim 7 further comprising incrementing a counter if the actual temperature difference is greater than the expected minimum temperature difference and determining whether the counter has exceeded a threshold wherein the maximum output torque of the electric machine is reduced if the counter has exceeded the threshold.

12. The method of claim 7 wherein the step of determining an actual temperature difference between the coolant and the power electronics includes measuring a temperature of the coolant.

13. The method of claim 7 wherein the step of determining an actual temperature difference between the coolant and the power electronics includes measuring a temperature associated with the power electronics.

14. A hybrid electric vehicle propulsion system comprising:
   an electric machine having a maximum output torque;
   power electronics to control the electric machine;
   a coolant to cool the electric machine and power electronics; and
   one or more controllers being configured to
      determine an expected temperature difference between the coolant and the power electronics,
      determine an actual temperature difference between the coolant and the power electronics,
      determine whether the actual temperature difference is greater than the expected temperature difference, and
      reduce the maximum output torque of the electric machine if the actual temperature difference is greater than the expected temperature difference.

15. The system of claim 14 wherein the expected temperature difference is based on a torque command for the electric machine.

16. The system of claim 14 wherein the expected temperature difference is based on an ambient temperature.

17. The system of claim 14 wherein the expected temperature difference is based on a vehicle speed.

18. The system of claim 14 wherein the one or more controllers are further configured to increment a counter if the actual temperature difference is greater than the expected temperature difference and to determine whether the counter has exceeded a threshold and wherein the maximum output torque of the electric machine is reduced if the counter has exceeded the threshold.

19. The system of claim 14 wherein the maximum output torque of the electric machine is reduced by an amount based on the difference between the actual temperature difference and the expected temperature difference.

* * * * *